United States Patent [19]

Chou

[11] Patent Number: 5,316,266
[45] Date of Patent: May 31, 1994

[54] STRAP EXTENDER AND TENSIONING SYSTEM

[76] Inventor: An-Chuan Chou, No. 212, Yung An Street, Tainan, Taiwan

[21] Appl. No.: 871,715

[22] Filed: Apr. 21, 1992

[51] Int. Cl.$^5$ .............................................. B66D 3/02
[52] U.S. Cl. .................................. 254/364; 254/369; 254/376; 74/142
[58] Field of Search ............... 254/359, 364, 369, 371, 254/376, DIG. 14, 217, 223; 74/142; 24/70 CT, 69 ST, 69 TM

[56] References Cited

U.S. PATENT DOCUMENTS

| | | | |
|---|---|---|---|
| 2,854,852 | 10/1958 | Clark | 254/369 |
| 3,163,399 | 12/1964 | Skerry | 254/369 |

*Primary Examiner*—Andrew M. Falik
*Attorney, Agent, or Firm*—Morton J. Rosenberg; David I. Klein

[57] ABSTRACT

A strap extending and tensioning system includes a strap winding mechanism to wind a predetermined length of strap on itself. A clevis slip hook is included for coupling to a rear end of a tow truck or the like. A strap tightener allowing the strap to be tightened passes through a through slot in the strap tightener. The strap tightener has a rotatable handle to rotate counter-clockwise a pair of ratchet wheels and a shaft to wind the strap on the shaft and thus place the strap in tension loading. Two pawls, as part of a pawl plate in the rotatable handle, may engage the ratchet wheels to rotate counter-clockwise through a biasing spring which pushes the pawl plate in a predetermined direction. The shaft can wind the strap to tighten it when the displaceable handle is rotated to provide a counter-clockwise rotation of the shaft.

1 Claim, 3 Drawing Sheets

STRAP EXTENDER AND TENSIONING SYSTEM

BACKGROUND OF THE INVENTION

This invention is directed to a strap extender and tensioning system adapted for coupling a pair of opposing objects in a tension loaded condition. In particular, the subject invention is directed to a strap extender and tensioning system where a strap may be extended to a predetermined length, secured to opposingly located objects and the strap tightened to provide a tensile loading therebetween.

SUMMARY OF THE INVENTION

The subject strap extender and tensioning system has been devised to have the following features:
1. Automatically rewinding an extended strap;
2. Allows tightening the extended strap in an extended length condition; and,
3. Allows the strap to be pulled out of a strap winder smoothly and quickly.

The strap extender and tensioning system of the present invention comprises a strap winding mechanism, a strap tightener, first and second connectors, and a clevis slip hook as main components.

The strap winding mechanism has a shaft to wind a predetermined length of strap thereon and includes two opposingly located side circular walls to capture the strap therebetween. The bottom of the strap winding mechanism is secured to the second connector which is attached to a clevis slip hook having a closing latch. The hook may be used for coupling to a vehicle or a wide variety of opposingly located objects.

The strap tightener consists of a shaft to wind the strap passing through a slot formed therethrough. Two ratchet wheels are fixed firmly to both ends of the shaft to allow concurrent rotation. A swingable or rotatable handle having its inner end portion rotatably secured with both ends of the shaft and two pawls in a pawl plate are biased by a spring to urge the pawls into engagement with the teeth of ratchet wheels. The rotatable handle may be rotated counter-clockwise for rotation of the ratchet wheels together with the shaft to wind the strap in a tightening condition, however, clockwise rotation of the handle does not rotate the ratchet wheels with the pawls sliding over the ratchet wheel teeth.

DETAILED DESCRIPTION OF THE PREFERRED EMBODIMENTS

Figure 1:
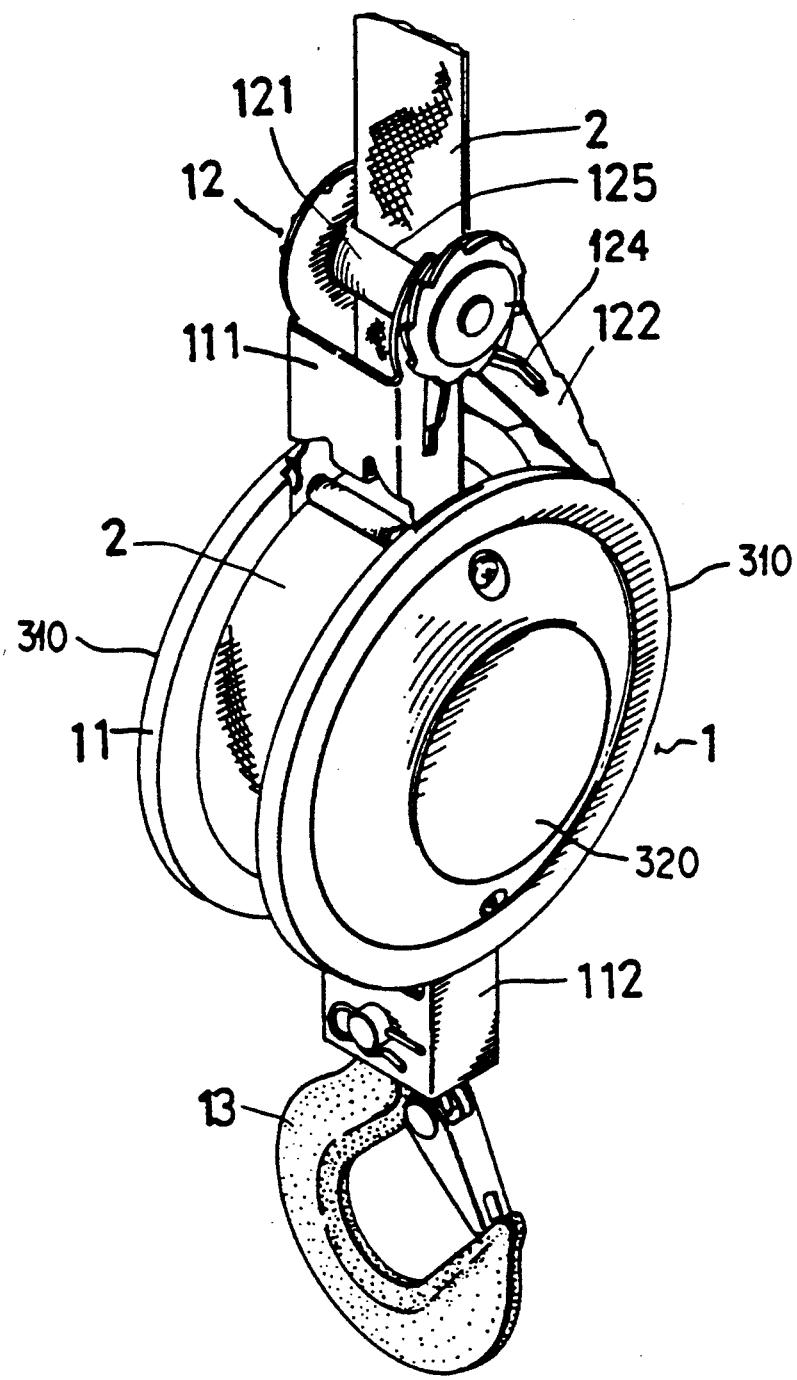
FIG. 1 is a perspective view of the strap extender and tensioning system of the subject inventive concept.

A strap extender and tensioning system 1 of the present invention is shown in FIG. 1 and comprises a strap winding mechanism 11, a strap tightener 12, a clevis slip hook 13, and a pair of connectors 111, 112 as its main components.

The strap winding mechanism 11 which is well-known in the prior art includes a rotatable shaft 320 elastically urged by a spring internal the shaft for automatically winding the strap 2. Two side circular walls 310 are provided for protecting the wound strap 2 on the shaft from release. The strap winding mechanism 11 is secured to a connector 111 at a top end section and to another connector 112 at a bottom end section, as shown.

The strap tightener 12 is fixedly coupled to the top section of the connector 111 and includes a horizontal shaft 121 bored with a diametrical through slot 125 for the strap 2 to pass through. A pair of ratchet wheels 123 are secured to opposing ends of the shaft 121 and interface with a swingable or rotatable handle 122. The swingable handle 122 has a spring 126 and a pawl plate 127 having two pawls 124 extending from both opposing sides to engage the teeth of the ratchet wheels 123.

The clevis slip hook 13 is connected at the bottom of the connector 112 and includes an automatic latch 132 fixed on a pivot pin 131 to automatically close the clevis of the hook 13.

Figure 2:
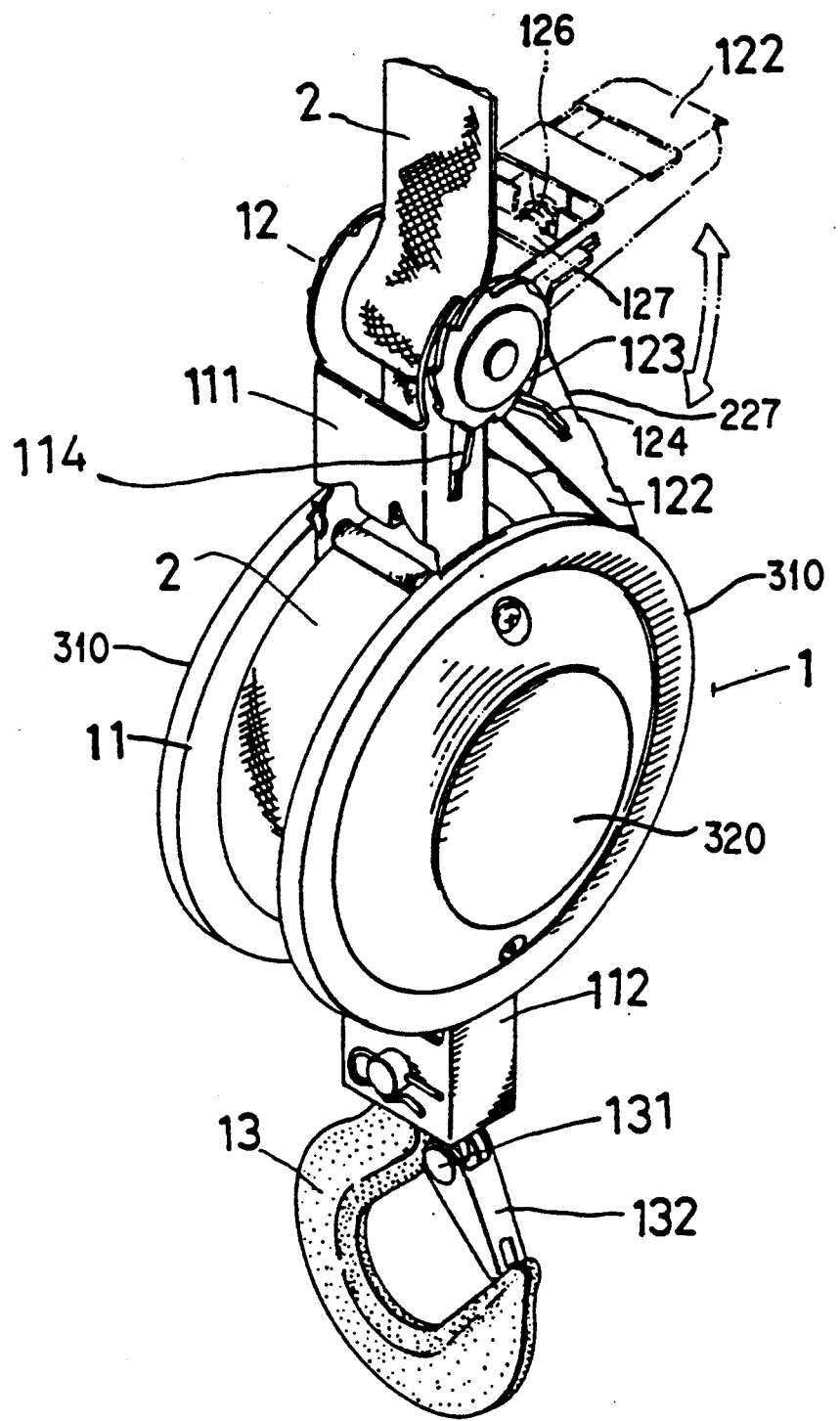
FIG. 2 is an operational view of the strap extender and tensioning system of the subject invention concept.

The rotatable handle 122 has two wall portions 227 at an inside end movably combined with both ends of the shaft 121. The two ratchet wheels 123 are respectively fixed securely on both ends of the shaft 121 so that the ratchet wheels 123 rotate with the shaft 121 as a unit. Each ratchet wheel 123 abuts the inside of the top end side portion of the rotatable handle 122. The connector 111 has both sides of its top portion respectively secured with both ends of the shaft 121 and abuts the inside of each ratchet wheel 123. The swingable or rotatable handle 122 is provided with the pawl plate 127 having two pawls 124 extending from both sides and being elastically biased by a spring 126 so that the pawls 124 always press on the teeth surface of the ratchet wheel 123 and slide thereon when the rotatable handle 122 is swung in a clockwise manner, as shown in FIG. 2, but engage one of the teeth of the ratchet wheels 123 when the rotatable handle 122 is rotated in a counter-clockwise direction. When the rotatable handle 122 is rotated counter-clockwise as shown in FIG. 2, after pawls 124 engage the ratchet wheel 123, the ratchet wheels 123 may be rotated by the rotatable handle 122, responsively rotating the shaft 121 with both the shaft 121 and ratchet wheels 123 rotating counter-clockwise.

The connector 111 has a pawl plate similar to pawl plate 127 having two pawls 114 and being elastically biased by a spring which acts similarly to spring 126 so that the two pawls 114 may also engage one of the teeth in each of the two ratchet wheels 123 and thus terminate the combined clockwise rotation of the ratchet wheels 123 and the shaft 121 when the rotatable handle 122 is rotated clockwise. The pawls 124 can slide over the teeth of the ratchet wheels 123 when the rotatable handle 122 is rotated in the clockwise direction. This release of the pawls 124 then allows the ratchet wheels to rotate in the clockwise direction. However, the pawls 114 on the connector 111 can prevent clockwise rotation of the ratchet wheels 123 as well as the shaft 121. when the shaft 121 rotates counter-clockwise, the strap 2 passing through slot 125 in the shaft 121 can be wound around the shaft 121 becoming tight after the strap 2 is hooked on an object to be pulled as shown in FIG. 2.

In assembling this strap extender and tensioner 1, first the strap 2 is passed through the through slot 125 in the shaft 121 and then wound around on the strap winding mechanism 11 which has an internally wound spring whereby releasing the wound spring automatically winds the strap 2.

Figure 3:
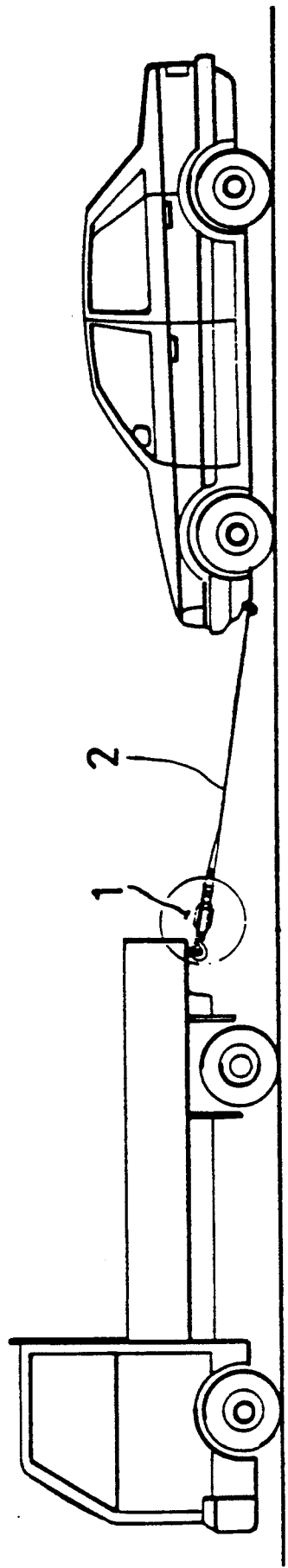
FIG. 3 is a side view of the strap extender and tensioning system of the present invention showing coupling to a vehicle; and, FIG. 4 is a frontal view of the strap extender and tensioning system of the subject invention concept.
Figure 4:
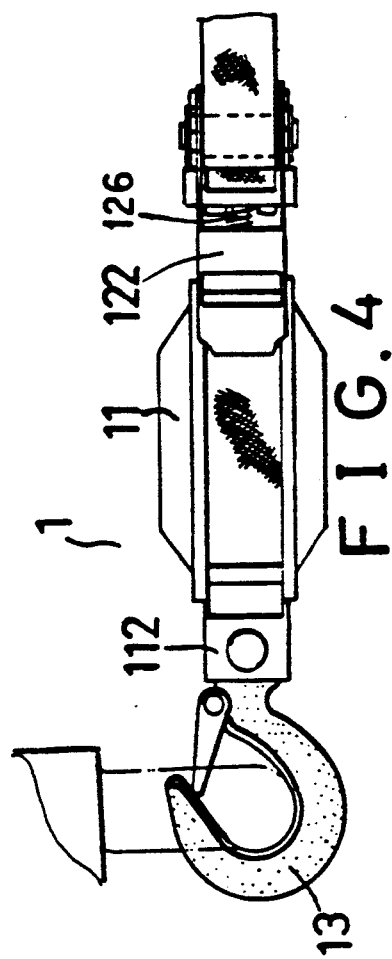

In using this strap extender and tensioner 1 for pulling a disabled vehicle as shown in FIGS. 3 and 4, the hook 13 is hooked firmly to a proper coupling area of the rear end of a tow truck and then the strap 2 is pulled out to a predetermined length to be secured to the front end of the disabled vehicle.

Additionally, the strap extender and tensioner 1 may be utilized as a laundry rope or strap mechanism to hang washed clothes thereon for drying by pulling the strap or rope 2 to a proper length and hooking both its ends and repeatedly swinging the rotatable handle 122 clockwise and counter-clockwise to rotate the ratchet wheels 123 and the shaft 121 together to wind the strap or rope 2 on the shaft 121 to tighten the strap or rope 2.

When the strap extender and tensioner 1 is utilized to securely bind a load of freight on a truck or the like, the strap 2 is pulled out of the winding mechanism 11 and placed on the load and the outer end of the strap 2 is firmly bound on one side of the load. The hook 13 is coupled to a hook on the other side of the truck. Finally, the rotatable handle 122 is swung repeatedly clockwise and counter-clockwise to tighten the strap 2 properly.

The strap extender and tensioner may also be utilized in mountaineering by hooking the hook 13 on the body of a climber and tightening the strap or rope 2 by operating the rotatable handle 122 and climbing up a mountain by pulling up the strap or rope 2, or by holding the strap or rope 2.

While the preferred embodiments of the invention have been described above, it will be recognized and understood that various modifications may be made therein and the appended Claims are intended to cover all such modifications which may fall within the spirit and scope of the invention.

What is claimed is:

1. A strap extender and tensioning system comprising:
    (a) a strap winding mechanism having an upper section secured to a first connector element and a lower section secured to a second connector element, said strap winding mechanism having a central rotatable shaft biased for reversibly winding a strap around said shaft, said strap winding mechanism having a pair of circular plate members mounted on opposing ends of said shaft for capturing said strap therebetween;
    (b) a clevis slip hook having a latch member, said clevis slip hook fixedly coupled to said second connector element;
    (c) strap tightening means for tightening said strap wound on said strap winding mechanism, said strap tightening mechanism including (1) a strap tightener shaft member having a through slot for passage of said strap therethrough, (2) a pair of ratchet wheels fixedly secured to opposing ends of said strap tightener shaft member and rotatable therewith, (3) and rotatably displaceable handle having a pair of opposing wall members formed on an upper section thereof and a pair of pawl members extending from opposing sides of a pawl plate for engagement with a tooth member formed on each of said ratchet wheels, said pawl plate being biased by a pawl spring member for biasing said pawl members toward said ratchet wheels, said rotatably displaceable handle being rotatable in a clockwise direction about said strap tightener shaft independent of said ratchet wheels and said pawl members being out of engagement with said ratchet wheel teeth, said rotatably displaceable handle being rotatable in a counter-clockwise direction wherein said pawl members engage said ratchet wheel teeth for rotatably displacing said ratchet wheels and said strap tightener shaft member and said strap being concurrently wound on said strap tightener shaft member, said first connector element having a lower section secured to said strap winding mechanism upper section, said first connector element having an upper section forming a pair of circularly shaped opposing walls rotatably secured to said strap tightener shaft member, a pair of connector pawl members extending from said circularly shaped opposing walls and biased for engagement with said ratchet wheel teeth when said ratchet wheel members are rotated in said clockwise direction, said strap initially being pulled from said strap winding mechanism to a predetermined length and then tightened for maintaining said strap in a tensioned manner.

* * * * *